(12) United States Patent  
Tamaoki et al.

(10) Patent No.: US 12,467,907 B2  
(45) Date of Patent: Nov. 11, 2025

(54) PREPARATIVE LIQUID CHROMATOGRAPH

(71) Applicant: SHIMADZU CORPORATION, Kyoto (JP)

(72) Inventors: Soichiro Tamaoki, Kyoto (JP); Tomoyuki Yamazaki, Kyoto (JP); Shohei Sato, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 305 days.

(21) Appl. No.: 18/221,621

(22) Filed: Jul. 13, 2023

(65) Prior Publication Data

US 2024/0044847 A1 Feb. 8, 2024

(30) Foreign Application Priority Data

Aug. 5, 2022 (JP) ................... 2022-125266

(51) Int. Cl.  
G01N 30/16 (2006.01)  
G01N 30/72 (2006.01)  
G01N 30/74 (2006.01)  
G01N 30/80 (2006.01)  
G01N 30/32 (2006.01)

(52) U.S. Cl.  
CPC ............ *G01N 30/16* (2013.01); *G01N 30/72* (2013.01); *G01N 30/74* (2013.01); *G01N 30/80* (2013.01); *G01N 2030/326* (2013.01)

(58) Field of Classification Search  
None  
See application file for complete search history.

(56) References Cited

U.S. PATENT DOCUMENTS

| 7,267,796 | B2 * | 9/2007 | Waki ..................... | G01N 30/82 |
| | | | | 422/89 |
| 9,322,813 | B2 * | 4/2016 | Anderson, Jr. ........ | G01N 30/38 |
| 2016/0131617 | A1 * | 5/2016 | Burnett .................. | G01N 30/32 |
| | | | | 73/61.56 |
| 2020/0033303 | A1 | 1/2020 | Tamaoki et al. | |
| 2022/0299488 | A1 * | 9/2022 | Tamaoki ................ | G01N 30/82 |
| 2022/0317101 | A1 * | 10/2022 | Ueda .................. | B01D 15/247 |

FOREIGN PATENT DOCUMENTS

WO 2018185872 A1 10/2018

* cited by examiner

*Primary Examiner* — Daniel S Larkin  
(74) *Attorney, Agent, or Firm* — Renner, Otto, Boisselle & Sklar, LLP

(57) ABSTRACT

Provided is a preparative liquid chromatograph capable of coping with a case where actual second delay time changes after start of a fractionation sequence. When a specific component detected as a peak in both a first detector and a second detector is injected during execution of a fractionation sequence, a control device executes maintenance operation of time difference information stored in an information storage area. In the maintenance operation, the control device executes peak determination as to whether or not a difference between first retention time and second retention time falls within a predetermined allowable range. By the above, the control device checks whether or not the second delay time from when a component is detected by the second detector to when the component reaches a fraction collector changes from a previous state.

6 Claims, 5 Drawing Sheets

FIG. 5
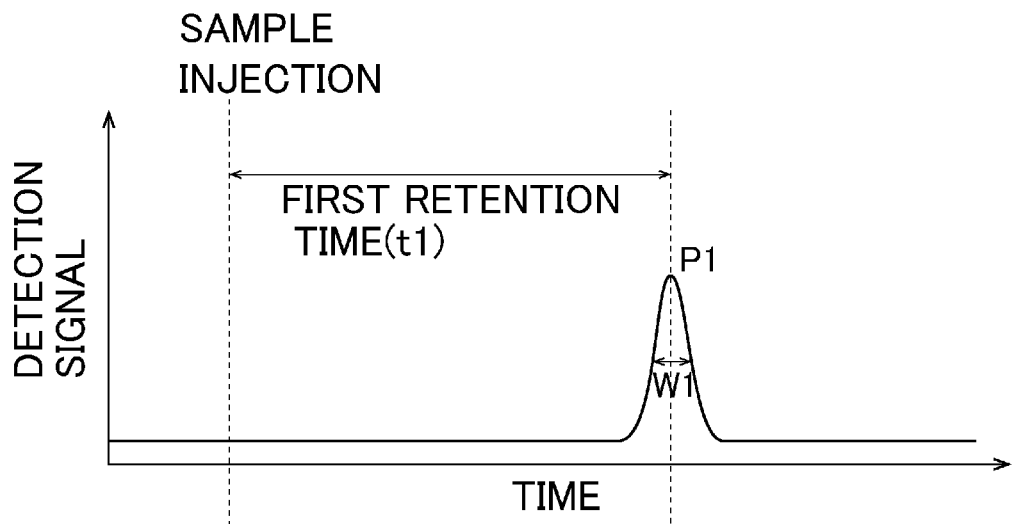
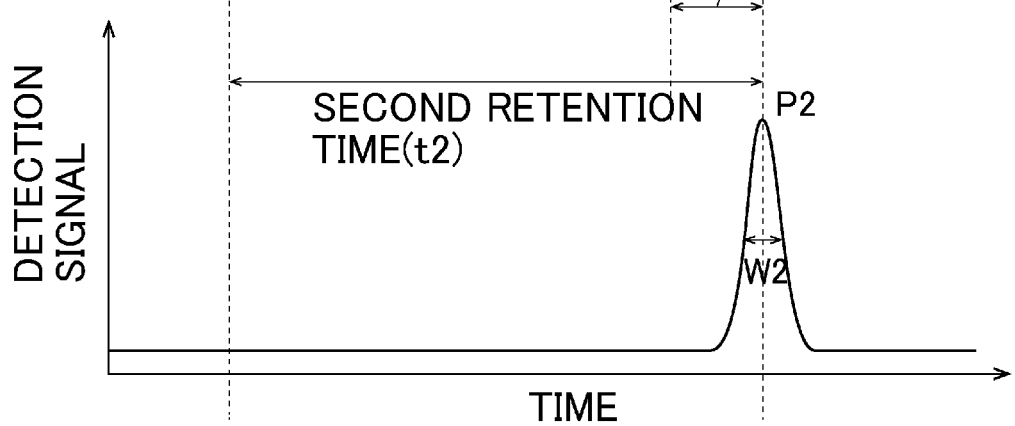

PREPARATIVE LIQUID CHROMATOGRAPH

BACKGROUND OF THE INVENTION

1. Field of the Invention

The present invention relates to a preparative liquid chromatograph.

2. Description of the Related Art

A preparative liquid chromatograph that separates a plurality of components contained in a sample from each other using liquid chromatography and collects a desired component among the separated components in an individual collection container is known (see WO 2018/185872 A).

The preparative liquid chromatograph includes a detector and a fraction collector provided downstream of a separation column for separating components in a sample from each other, and a control device that controls operation of the fraction collector based on an output signal from the detector. Components separated from each another in the separation column appear as peaks in an output signal from the detector when introduced into the detector. When a peak of a component to be collected appears on the output signal from the detector, the control device detects that the component passes through the detector, and controls operation of the fraction collector so that a portion corresponding to the peak is guided to the collection container. Time (hereinafter, referred to as delay time) from when the component to be collected passes through the detector until the component reaches the fraction collector is determined by internal capacity of a flow path from the detector to the fraction collector and a flow rate of a mobile phase. The control device calculates the delay time at a predetermined timing (for example, a timing at which a flow rate of a mobile phase is set) before start of fractionation, and controls operation of the fraction collector in consideration of the delay time after start of fractionation.

In some cases, in a preparative liquid chromatograph, a flow path is branched between a separation column and a detector (referred to as a first detector), a part of eluate is taken out and guided to another detector (referred to as a second detector) such as a mass spectrometer, and a component that is difficult to be detected by the first detector is detected by the second detector, so that component fractionation performance is improved. In this case, since time required for a component eluted from the separation column to reach the first detector is not exactly the same as time required for a component to reach the second detector, when a component is collected on the basis of a signal output from the second detector, it is necessary to apply delay time (hereinafter, referred to as second delay time) different from delay time (hereinafter, referred to as first delay time) applied in a case where a component is collected on the basis of a signal output from the first detector.

The second delay time is obtained by calculating a difference between retention time (referred to as first retention time) from injection of a component in a mobile phase to detection of the component as a peak by the first detector and retention time (referred to as second retention time) from injection of the same component in the mobile phase to detection of the component as a peak by the second detector, and adding the difference to the first delay time determined by internal capacity of a flow path from the detector to the fraction collector and a flow rate of the mobile phase.

SUMMARY OF THE INVENTION

As described above, in the preparative liquid chromatograph including two detectors, in an initial setting before start of a fractionation sequence of injecting one or more samples and collecting a desired component in an individual collection container, a standard sample containing a specific component is injected to obtain the second delay time, and the second delay time is stored in a device together with the first delay time as a parameter for fractionation.

During execution of the fractionation sequence, the actual second delay time may change from a value set before the start of the fractionation sequence due to, for example, occurrence of clogging in the flow path leading to the second detector. However, in a conventional preparative liquid chromatograph, since a parameter for fractionation cannot be corrected during execution of the fractionation sequence, there has been a problem that the fractionation sequence is continued using the initial second delay time even if such a situation occurs, and component collection is not normally executed.

The present invention has been made in view of the above problem, and an object of the present invention is to provide a preparative liquid chromatograph capable of coping with a case where the actual second delay time changes after start of a fractionation sequence.

A preparative liquid chromatograph according to the present invention includes a liquid delivery pump that delivers a mobile phase at a set flow rate, an injector that injects a sample into a mobile phase fed by the liquid delivery pump, a separation column for separating components in the sample injected into the mobile phase by the injector from each other, an outlet flow path fluidly connected to an outlet of the separation column and through which eluate from the separation column flows, a branch flow path that branches from the outlet flow path and for extracting a part of flow of the eluate in the outlet flow path, a first detector fluidly connected to the outlet flow path and configured to output a first signal corresponding to concentration of each component in the eluate, a second detector that is fluidly connected to the branch flow path and outputs a second signal corresponding to concentration of each component in the eluate supplied through the branch flow path, a fraction collector fluidly connected to an outlet of the first detector for collecting a desired portion of the eluate from the separation column in an individual collection container, and a control device configured to execute a set fractionation sequence by controlling operation of the liquid delivery pump, the injector, and the fraction collector. The control device has an information storage area that stores initial setting information set before the fractionation sequence is started. The initial setting information includes time difference information and a first delay time. The time difference information is information as to a time difference between time required for a component eluted from the separation column to be detected as a peak in the first signal and time required for a component eluted from the separation column to be detected as a peak in the second signal, and the first delay time is time required for a component detected as a peak in the first signal to reach the fraction collector. During execution of the fractionation sequence, the control device is configured to apply the first delay time to control of operation of the fraction collector in first collection operation of collecting a component detected as a peak in the first signal to the collection container, and to apply second delay time to control of operation of the fraction collector in second collection operation of collecting a component detected as a peak in the second signal in the collection container. The second delay time is time until a component detected as a peak in the second signal reaches the fraction collector and is obtained by using the time difference information and the first delay time stored in the information storage area. The control device is further configured to execute maintenance operation of the time difference information stored in the information storage area when a specific component detected as a peak in both the first signal and the second signal is injected into the mobile phase during execution of the fractionation sequence. The control device is configured, in the maintenance operation, to calculate a difference between first retention time from when the specific component is injected into the mobile phase until the specific component is detected as a peak in the first signal and second retention time from when the specific component is injected into the mobile phase until the specific component is detected as a peak in the second signal, to execute peak determination as to whether or not the calculated difference falls within an allowable range set with reference to the time difference information, and when the calculated difference is out of the allowable range in the peak determination, to update the time difference information stored in the information storage area with the calculated difference.

That is, in the present invention, when a specific component detected as a peak in both the first detector and the second detector is injected during execution of the fractionation sequence, the maintenance operation of the time difference information stored in the information storage area is executed. In the maintenance operation, peak determination as to whether or not a difference between the first retention time and the second retention time falls within a predetermined allowable range is executed. By the above, whether or not the second delay time from when a component is detected by the second detector to when the component reaches the fraction collector changes from a previous state is automatically checked. Then, when the second delay time is determined to change from the previous state as a result of the peak determination, the time difference information stored in the information storage area is updated to a latest state with the difference between the calculated first retention time and second retention time. Therefore, it is possible to cope with a case where the second delay time changes after start of the fractionation sequence.

According to a preparative liquid chromatograph of the present invention, when a specific component is injected during execution of a fractionation sequence, maintenance operation of time difference information stored in an information storage area is executed, and, in the maintenance operation, if second delay time is determined to change from a previous state, the time difference information stored in the information storage area is updated to a latest state. Therefore, it is possible to cope with a case where the second delay time changes after start of the fractionation sequence.

BRIEF DESCRIPTION OF THE DRAWINGS

FIG. 5 is a diagram of a chromatogram of a first signal and a second signal for explaining first retention time, second retention time, a difference between the first retention time and the second retention time, and a peak width.

DETAILED DESCRIPTION OF THE INVENTION

Figure 1:
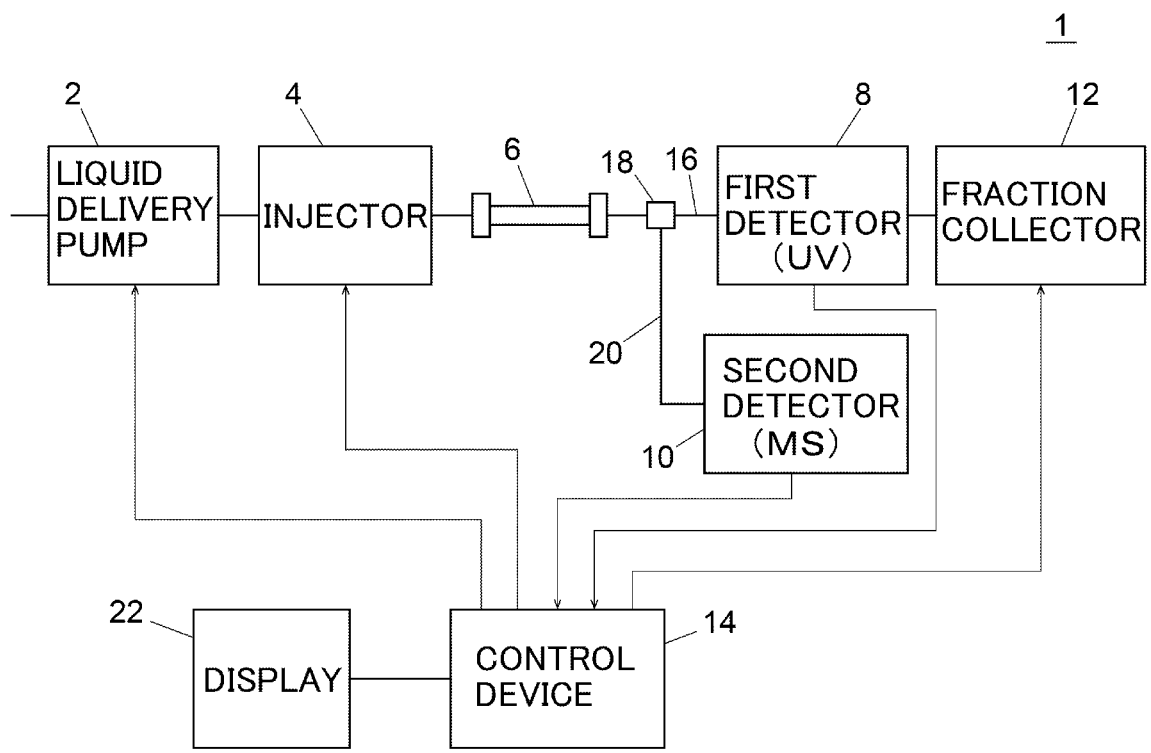
FIG. 1 is a schematic configuration diagram illustrating an embodiment of a preparative liquid chromatograph.

Hereinafter, an embodiment of a preparative liquid chromatograph according to the present invention will be described with reference to the accompanying drawings.

A preparative liquid chromatograph 1 mainly includes a liquid delivery pump 2, an injector 4, a separation column 6, a first detector 8, a second detector 10, a fraction collector 12, and a control device 14.

The liquid delivery pump 2 is a device for delivering a mobile phase. The injector 4 is for injecting a sample into a mobile phase fed by the liquid delivery pump 2. The separation column 6 is provided downstream of the injector 4. A plurality of components in a sample injected into a mobile phase by the injector 4 are separated from each other in the separation column 6.

The first detector 8 is fluidly connected to an outlet flow path 16 fluidly connected to an outlet of the separation column 6, and the second detector 10 is fluidly connected to a branch flow path 20. The branch flow path 20 is a flow path branched from the outlet flow path 16 at a branch portion 18 between the separation column 6 and the first detector 8. Flow of eluate from the separation column 6 is divided at the branch portion 18, most of the flow of the eluate is introduced into the first detector 8, and a part of the flow of the eluate is introduced into the second detector 10. A flow rate of eluate introduced into the second detector 10 through the branch flow path 20 is about $1/800$ to $1/5000$ of a flow rate of the eluate introduced into the first detector 8. The first detector is a detector such as a UV detector that outputs a signal (hereinafter, a first signal) corresponding to a component concentration in eluate flowing through the outlet flow path 16. The second detector is a detector such as a mass spectrometer (MS) that outputs a signal (hereinafter, a second signal) corresponding to a concentration of a component in eluate taken out from the outlet flow path 16 by the branch flow path 20. The second detector 10 is a detector for complementing a detection characteristic of the first detector 8, and detects a component that does not appear as a peak in the first signal output by the first detector 8 as a peak.

The fraction collector 12 is fluidly connected to an outlet of the first detector 8. The fraction collector 12 is a device for collecting a desired portion of eluate from the separation column 6 in a collection container as a fraction downstream of the first detector 8.

The control device 14 is a device for controlling operation of the liquid delivery pump 2, the injector 4, and the fraction collector 12. The control device 14 can be realized by a dedicated computer or a personal computer in which dedicated software is installed. A display for displaying various types of information is electronically connected to the control device 14.

When a fractionation sequence set by the user is started, the control device 14 sequentially injects one or more samples registered in the fractionation sequence into a mobile phase by the injector 4, detects each component in eluate from the separation column 6 as a peak on a chromatogram of the first signal output from the first detector 8 or a chromatogram of the second signal output from the second detector 10, and controls operation of the fraction collector 12 so that each component detected as a peak is collected in an individual collection container.

When executing operation of collecting a component detected as a peak in the first signal output from the first detector 8 in a collection container (referred to as first collection operation), the control device 14 considers time T1 (hereinafter, referred to as first delay time T1) required from when the component is detected as a peak by the first detector 8 until the component reaches the fraction collector 12. That is, the control device 14 causes the fraction collector 12 to execute operation of collecting eluate in a collection container when the first delay time T1 elapses after a peak of a target component is detected in the first signal of the first detector 8.

On the other hand, when executing operation of collecting a component detected as a peak in the second signal output from the second detector 10 in a collection container (referred to as second collection operation), the control device 14 considers time T2 (hereinafter, referred to as second delay time T2) required from when the component is detected as a peak by the second detector 10 until the component reaches the fraction collector 12. That is, the control device 14 causes the fraction collector 12 to execute operation of collecting eluate in a collection container when the second delay time T2 elapses after a peak of a target component is detected in the second signal of the second detector 10.

The first delay time T1 can be obtained by using a liquid delivery flow rate L of a mobile phase by the liquid delivery pump 2 and internal capacity V of a flow path from the first detector 8 to the fraction collector 12. That is, the first delay time T1 is obtained by $$T1 = V/L \qquad (1).$$

On the other hand, the second delay time T2 can be obtained by adding a time difference Δt between a timing at which a component eluted from the separation column 6 reaches the first detector 8 and a timing at which a component eluted from the separation column 6 reaches the second detector 10 to the first delay time T1. The time difference Δt can be obtained by taking a difference (t2−t1) between time t1 (hereinafter, referred to as first retention time t1) from when a certain component is injected into a mobile phase by the injector 4 until the component appears as a peak in the first signal of the first detector 8 and time t2 (hereinafter, referred to as second retention time t2) from when a certain component is injected into a mobile phase by the injector 4 until the component appears as a peak in the second signal of the second detector 10. That is, the second delay time T2 is obtained by $$T2 = T1 - (t2 - t1) \qquad (2).$$

The first delay time T1, the time difference Δt, and the second delay time T2 are set in initial setting operation executed before a fractionation sequence. The control device 14 is configured to execute the initial setting operation before executing a fractionation sequence.

Figure 2:
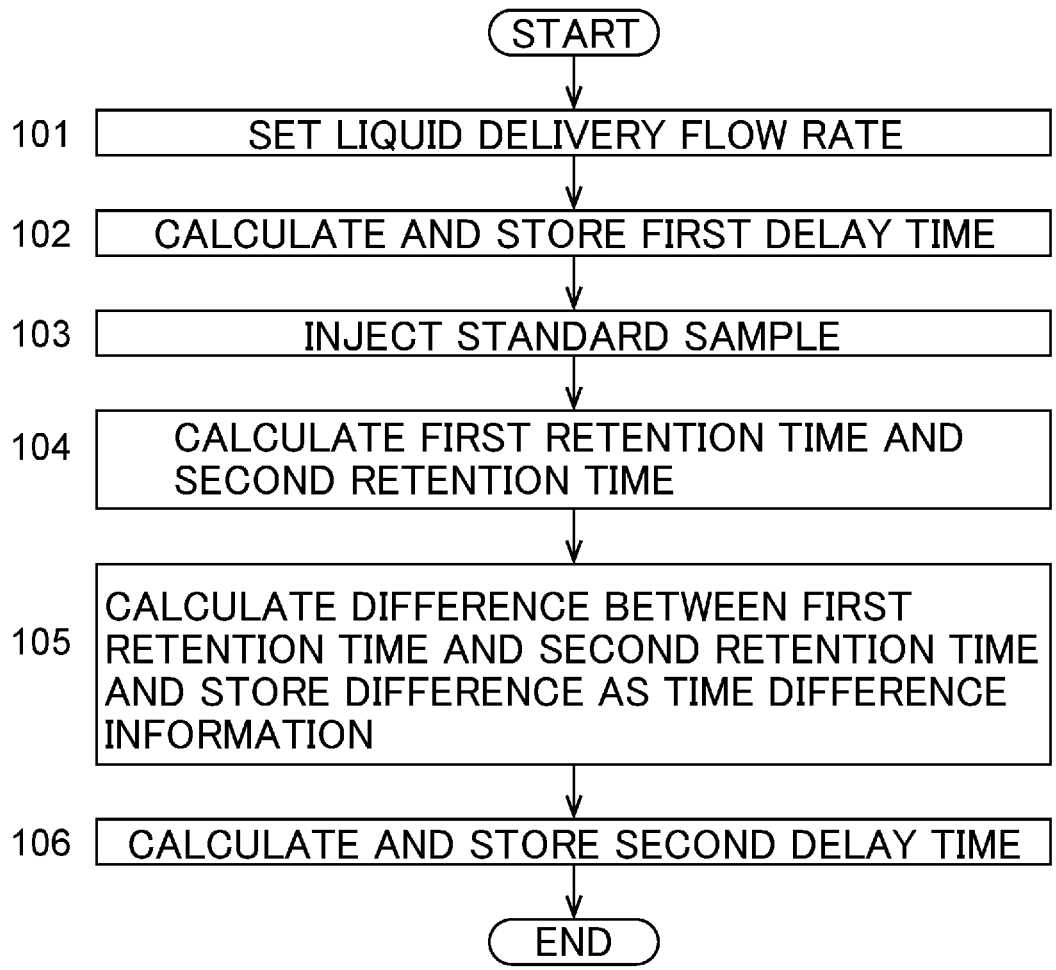
FIG. 2 is a flowchart for explaining an example of initial setting before a fractionation sequence in the embodiment is started.

An example of the initial setting operation will be described with reference to FIG. 1 and a flowchart of FIG. 2. Note that, hereinafter, it is assumed that the injector 4 can access a container containing a standard sample. The standard sample is a sample containing a known component (hereinafter, referred to as specific component) that appears as a peak in both the first signal of the first detector 8 and the second signal of the second detector 10.

In initial setting, the control device 14 prompts the user to set a liquid delivery flow rate of a mobile phase (Step 101). When the user sets a liquid delivery flow rate (L), the control device 14 calculates the first delay time T1 by using the set liquid delivery flow rate (L) and information (for example, information on an inner diameter and length of a pipe) on internal capacity (V) of a flow path between the first detector 8 and the fraction collector 12 registered at the time of installation of the preparative liquid chromatograph or the like, and stores the first delay time T1 in an information storage area provided in the control device 14 (Step 102).

The control device 14 feeds a mobile phase at a flow rate set to the liquid delivery pump 2 and then injects the standard sample into the injector 4 (Step 103). After the standard sample is injected into a mobile phase, as illustrated in FIG. the control device 14 measures first retention time (t1) from the injection of the standard sample to the detection of a vertex of a peak P1 of the specific component in a chromatogram of the first signal of the first detector 8, and first retention time (t2) from the injection of the standard sample to detection of a vertex of a peak P2 of the specific component in a chromatogram of the second signal of the second detector 10 (Step 104), calculates a difference (t2−t1) between the first retention time (t1) and the second retention time (t2), and stores the calculated difference (t2−t1) in an information storage area as time difference information (Δt) (Step 105). Furthermore, the control device 14 calculates second delay time (T2) by using first delay time (T1) and the time difference information (Δt) obtained by calculation, and stores the calculated second delay time (T2) in an information storage area (Step 106).

Figure 3:
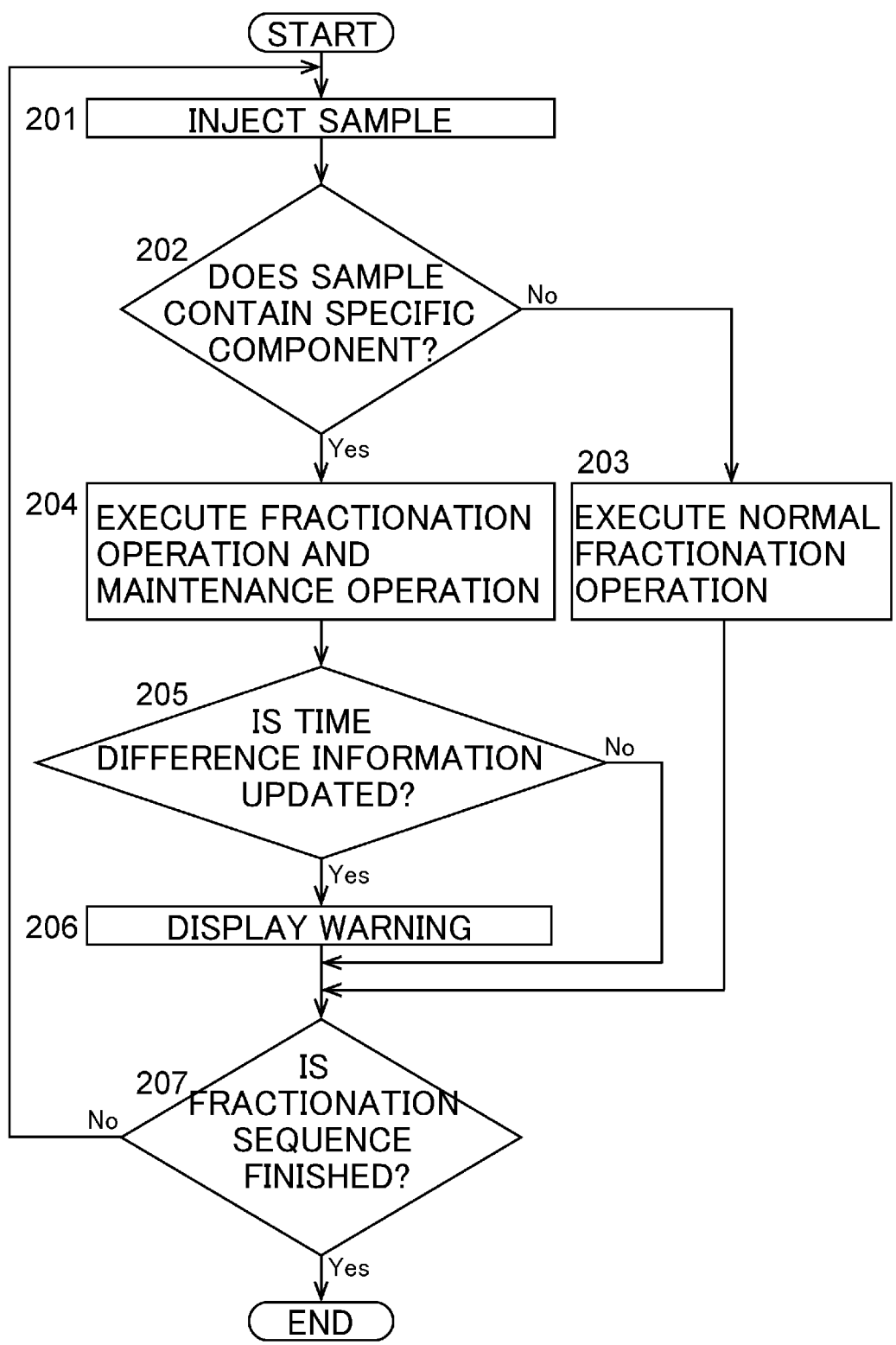
FIG. 3 is a flowchart for explaining an example of operation during the fractionation sequence in the embodiment.

After the above initial setting is completed, the control device 14 starts a fractionation sequence when there is an instruction to execute the fractionation sequence from the user. Operation during execution of the fractionation sequence will be described with reference to FIG. 1 and a flowchart of FIG. 3.

When a fractionation sequence is started, the control device 14 controls the injector 4 so that one or more samples are injected into a mobile phase in set order. When a certain sample is injected into a mobile phase by the injector 4 (Step 201), the control device 14 checks, based on sample information registered in advance, whether or not the injected sample contains a specific component appearing as a peak in both the first signal of the first detector 8 and the second signal of the second detector 10 (Step 202).

In a case where the injected sample does not contain the specific component (Step 202: No), the control device 14 executes normal extraction operation (Step 203). On the other hand, when the injected sample contains the specific component (Step 202: Yes), the control device 14 executes maintenance operation simultaneously with the normal fractionation operation (Step 204). The maintenance operation is operation of checking whether or not the time difference (t2−t1) between the current first retention time (t1) and second retention time (t2) is changed from the time difference information (Δt) stored in an information storage area, and in a case where the time difference (t2−t1) is changed from the time difference information (Δt) stored in the information storage area, updating the time difference information (Δt) and the second delay time (T2) stored in the information storage area by using the newly obtained time difference (t2−t1). In a case where the time difference information (Δt) and the second delay time (T2) stored in the information storage area are updated by the maintenance operation (Step 205: Yes), a warning is displayed on a display 22 or the like to notify the user that the time difference information (Δt) and the second delay time (T2) are updated (Step 206). With this warning, the user can recognize that a problem such as clogging occurs in the branch flow path 20 leading to the second detector 10.

When the time difference information (Δt) and the second delay time (T2) stored in the information storage area are updated by the maintenance operation, the control device 14 applies the updated second delay time (T2) to the second collection operation executed after that. As described above, until the set fractionation sequence is completed (Step 207), the maintenance operation is performed every time a sample containing the specific component is injected into a mobile phase, and the second delay time (T2) is updated to a latest state.

Note that, in a case of executing the second collection operation by using the second delay time (T2) updated in the maintenance operation, the control device 14 may be configured to execute operation for checking a recovery rate of a component as a target of the second collection operation. For example, in a case where the injector 4 is configured to be accessible to the collection container containing a component collected by the fraction collector 12, an entire amount of a target component is injected after the set extraction sequence is finished or the like. Then, a peak area (A1) of the component in a chromatogram of the second signal is obtained, and the obtained peak area (A1) is compared with a peak area (A2) of the component in a chromatogram of the second signal used at the time of collection of the component. When the peak area (A1) of the target component after collection is equal to or larger than a predetermined ratio (for example, 95%) of the peak area (A2) of the target component before collection, it can be evaluated that there is no problem in the second collection operation performed by applying the updated second delay time (T2). On the other hand, in a case where the peak area (A1) of the target component after collection is less than the predetermined ratio of the peak area (A2) of the target component before collection, it can be evaluated that there is a problem in the second collection operation performed by applying the updated second delay time (T2). In this case, the control device 14 can issue a warning to the user.

Figure 4:
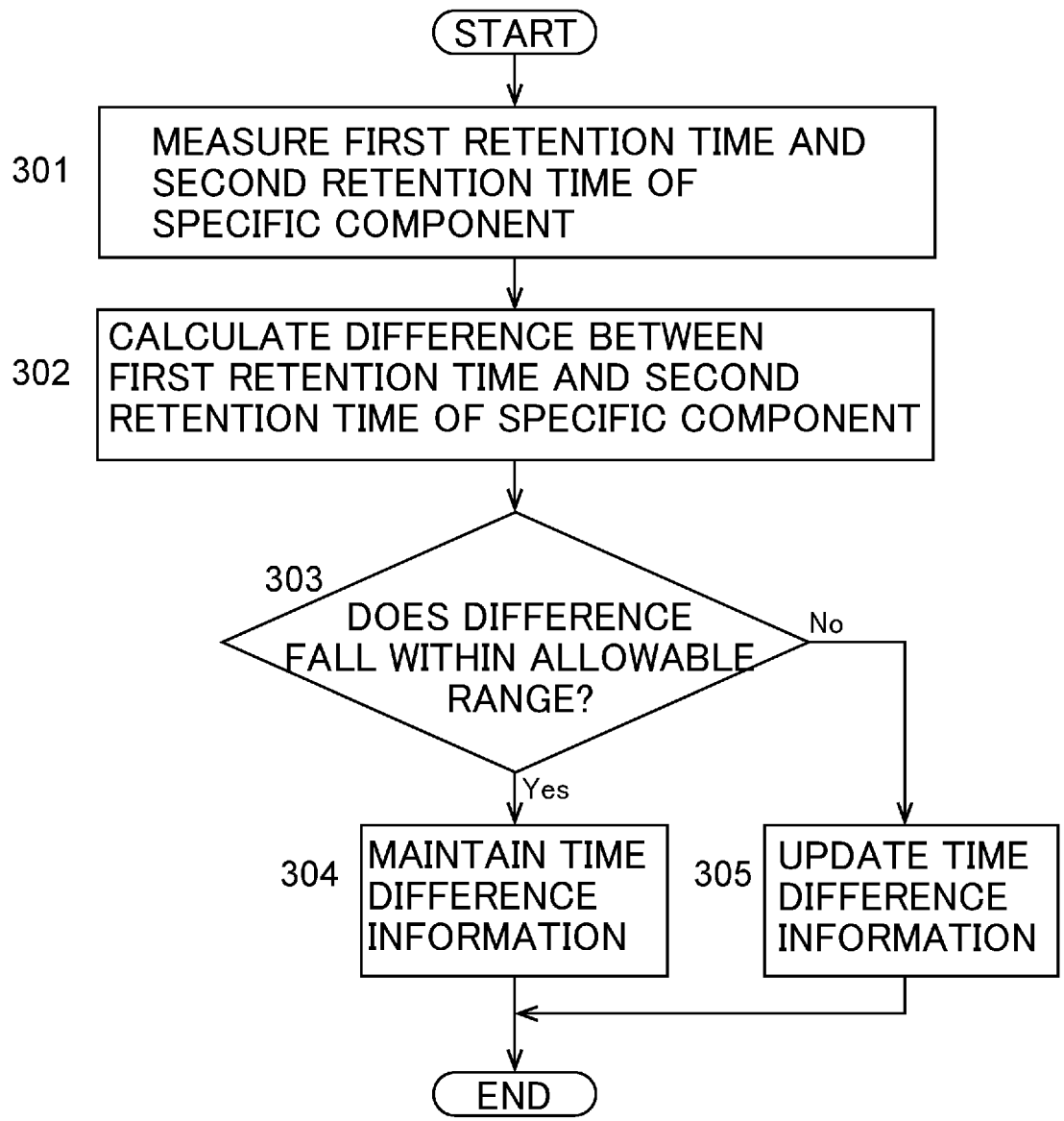
FIG. 4 is a flowchart for explaining an example of maintenance operation in the embodiment.

Next, an example of the maintenance operation will be described with reference to a flowchart of FIG. 4.

In the maintenance operation, the control device 14 measures the first retention time (t1) and the second retention time (t2) for the specific component, for example, with reference to a vertex of a peak of the specific component appearing in each chromatogram of the first signal and the second signal (Step 301), and calculates a difference (t2−t1) between the measured first retention time (t1) and second retention time (t2) (Step 302). Then, the control device 14 executes peak determination as to whether or not the calculated difference (t2−t1) falls within an allowable range set with reference to the time difference information (Δt) stored in an information storage area (Step 303), and if the difference (t2−t1) falls within the allowable range, maintains the time difference information (Δt) stored in the information storage area without updating (Step 304). On the other hand, when the calculated difference (t2−t1) is out of the allowable range, the control device 14 rewrites the time difference information (Δt) in the information storage area with the newly calculated difference (t2−t1), and updates the time difference information (Δt) to a latest state (Step 305).

Note that, in the peak determination (Step 303), the control device 14 may calculate a ratio (W1/W2) between a peak width (W1) of a peak of the specific component on a chromatogram of the first signal and a peak width (W2) of a peak of the specific component on a chromatogram of the second signal, and determine whether or not the calculated ratio (W1/W2) falls within a predetermined reference range. The peak width (W1, W2) may be a half-value width of each peak as illustrated in FIG. 5. The control device 14 can be configured to issue a warning to the user in a case where the ratio (W1/W2) of a peak width is out of the predetermined reference range. When clogging or the like occurs in a flow path leading to any one of the detectors, in many cases, a ratio (W1/W2) of the peak widths changes. Therefore, by monitoring the ratio (W1/W2) of the peak widths, occurrence of such a problem can be detected.

The embodiment described above is merely an example of an embodiment of the preparative liquid chromatograph according to the present invention. The embodiment of the preparative liquid chromatograph according to the present invention is as shown below.

The embodiment of the preparative liquid chromatograph according to the present invention includes a liquid delivery pump that delivers a mobile phase at a set flow rate;

an injector that injects a sample into a mobile phase fed by the liquid delivery pump;

a separation column for separating components in the sample injected into the mobile phase by the injector from each other;

an outlet flow path fluidly connected to an outlet of the separation column and through which eluate from the separation column flows;

a branch flow path that branches from the outlet flow path and for extracting a part of flow of the eluate in the outlet flow path;

a first detector fluidly connected to the outlet flow path and configured to output a first signal corresponding to concentration of each component in the eluate;

a second detector fluidly connected to the branch flow path and configured to output a second signal corresponding to concentration of each component in the eluate supplied through the branch flow path;

a fraction collector fluidly connected to an outlet of the first detector for collecting a desired portion of the eluate from the separation column in an individual collection container; and a control device configured to execute a set fractionation sequence by controlling operation of the liquid delivery pump, the injector, and the fraction collector, wherein the control device has an information storage area that stores initial setting information set before the fractionation sequence is started, the initial setting information includes time difference information and a first delay time, the time difference information is information as to a time difference between time required for a component eluted from the separation column to be detected as a peak in the first signal and time required for a component eluted from the separation column to be detected as a peak in the second signal, and the first delay time is time required for a component detected as a peak in the first signal to reach the fraction collector, during execution of the fractionation sequence, the control device is configured to apply the first delay time to control of operation of the fraction collector in first collection operation of collecting a component detected as a peak in the first signal to the collection container, and to apply second delay time to control of operation of the fraction collector in second collection operation of collecting a component detected as a peak in the second signal in the collection container, the second delay time is time until a component detected as a peak in the second signal reaches the fraction collector and is obtained by using the time difference information and the first delay time stored in the information storage area, the control device is further configured to execute maintenance operation of the time difference information stored in the information storage area when a specific component detected as a peak in both the first signal and the second signal is injected into the mobile phase during execution of the fractionation sequence, and the control device is configured, in the maintenance operation, to calculate a difference between first retention time from when the specific component is injected into the mobile phase until the specific component is detected as a peak in the first signal and second retention time from when the specific component is injected into the mobile phase until the specific component is detected as a peak in the second signal, to execute peak determination as to whether or not the calculated difference falls within an allowable range set with reference to the time difference information, and when the calculated difference is out of the allowable range in the peak determination, to update the time difference information stored in the information storage area with the calculated difference.

In a first aspect of the embodiment, the control device is configured to issue a warning to a user in a case of determining that the difference between the first retention time and the second retention time is out of the allowable range in the peak determination. With such an aspect, the user can easily recognize that a problem such as clogging occurs in the branch flow path leading to the second detector.

In a second aspect of the embodiment, in the peak determination, the control device is configured to calculate a difference in time between vertices of peaks of the specific component that appear in the first signal and the second signal when the injection of the specific component is executed as the difference between the first retention time and the second retention time. This second aspect can be combined with the first aspect.

In a third aspect of the embodiment, in the peak determination, the control device is configured to calculate a ratio between a width of a peak of the specific component appearing in the first signal and a width of a peak of the specific component appearing in the second signal, determine whether or not the ratio falls within a predetermined reference range, and issue a warning to a user in a case where the ratio is out of the predetermined reference range. This third aspect can be combined with the first aspect and/or the second aspect described above.

In a fourth aspect of the embodiment, the injector is configured to be able to inject a component collected in the collection container into the mobile phase as a sample, and the control device is configured to, after executing the second collection operation by applying the second delay time calculated by using the updated time difference information, reinject a component collected in the collection container in the second collection operation executed by applying the second delay time into the mobile phase, and evaluate a recovery rate of the component in the second collection operation based on a peak area of the reinjected component in the second signal. According to such an aspect, since evaluation as to whether there is a problem in the second collection operation based on the time difference information updated during the fractionation sequence is automatically performed, workload of the user for checking whether or not there is a problem in the executed second collection operation is reduced. This fourth aspect can be combined with the first aspect, the second aspect, and/or the third aspect described above.

In a fifth aspect of the embodiment, the second detector is a mass spectrometer. This fifth aspect can be combined with the first aspect, the second aspect, the third aspect, and/or the fourth aspect described above.

DESCRIPTION OF REFERENCE SIGNS

2: liquid delivery pump
4: injector
6: separation column
8: first detector
10: second detector
12: fraction collector
14: control device
16: outlet flow path
18: branch portion
20: branch flow path
22: display

What is claimed is:

1. A preparative liquid chromatograph comprising:
a liquid delivery pump that delivers a mobile phase at a set flow rate;
an injector that injects a sample into the mobile phase fed by the liquid delivery pump;
a separation column configured for separating components in the sample injected into the mobile phase by the injector from each other;
an outlet flow path fluidly connected to an outlet of the separation column and through which eluate from the separation column flows;
a branch flow path that branches from the outlet flow path and for extracting a part of flow of the eluate in the outlet flow path;
a first detector fluidly connected to the outlet flow path and configured to output a first signal corresponding to a concentration of each component in the eluate;
a second detector fluidly connected to the branch flow path and configured to output a second signal corresponding to the concentration of each component in the eluate supplied through the branch flow path;
a fraction collector fluidly connected to an outlet of the first detector for collecting a desired portion of the eluate from the separation column in an individual collection container; and
a control device configured to execute a set fractionation sequence by controlling operation of the liquid delivery pump, the injector, and the fraction collector,
wherein the control device has an information storage area that stores initial setting information set before the fractionation sequence is started, the initial setting information includes a time difference information and a first delay time, the time difference information is information as to a time difference between a time required for a component eluted from the separation column to be detected as a peak in the first signal and the time required for the component eluted from the separation column to be detected as a peak in the second signal, and the first delay time is the time required for the component detected as a peak in the first signal to reach the fraction collector, during execution of the fractionation sequence, the control device is configured to apply the first delay time to control operation of the fraction collector in a first collection operation of collecting the component detected as the peak in the first signal to the collection container, and to apply a second delay time to control operation of the fraction collector in a second collection operation of collecting the component detected as the peak in the second signal in the collection container, the second delay time is the time until the component detected as the peak in the second signal reaches the fraction collector and is obtained by using the time difference information and the first delay time stored in the information storage area, the control device is further configured to execute a maintenance operation of the time difference information stored in the information storage area when a specific component detected as a peak in both the first signal and the second signal is injected into the mobile phase during execution of the fractionation sequence, and the control device is configured, in the maintenance operation, to calculate a difference between a first retention time from when the specific component is injected into the mobile phase until the specific component is detected as the peak in the first signal and a second retention time from when the specific component is injected into the mobile phase until the specific component is detected as the peak in the second signal, to execute peak determination as to whether or not the calculated difference falls within an allowable range set with reference to the time difference information, and when the calculated difference is out of the allowable range in the peak determination, to update the time difference information stored in the information storage area with the calculated difference.

2. The preparative liquid chromatograph according to claim 1, wherein the control device is configured to issue a warning to a user in a case of determining that the difference between the first retention time and the second retention time is out of the allowable range in the peak determination.

3. The preparative liquid chromatograph according to claim 1, wherein in the peak determination, the control device is configured to calculate a difference in time between vertices of peaks of the specific component that appear in the first signal and the second signal when the injection of the specific component is executed as the difference between the first retention time and the second retention time.

4. The preparative liquid chromatograph according to claim 1, wherein in the peak determination, the control device is configured to calculate a ratio between a width of the peak of the specific component appearing in the first signal and a width of the peak of the specific component appearing in the second signal, to determine whether or not the ratio falls within a predetermined reference range, and to issue a warning to a user in a case where the ratio is out of the predetermined reference range.

5. The preparative liquid chromatograph according to claim 1, wherein the injector is configured to be able to inject the component collected in the collection container into the mobile phase as the sample, and the control device is configured, after executing the second collection operation by applying the second delay time calculated by using the updated time difference information, to reinject a component collected in the collection container in the second collection operation executed by applying the second delay time into the mobile phase, and to evaluate a recovery rate of the component in the second collection operation based on a peak area of the reinjected component in the second signal.

6. The preparative liquid chromatograph according to claim 1, wherein the second detector is a mass spectrometer.

* * * * *